(12) United States Patent
Newkirk et al.

(10) Patent No.: US 10,226,034 B2
(45) Date of Patent: Mar. 12, 2019

(54) BAIT CONTAINER INSERT, BAIT BUCKET DIVIDER

(71) Applicants: Philip Wayne Newkirk, Granbury, TX (US); Kyle Justin Rucker, Mineral Wells, TX (US)

(72) Inventors: Philip Wayne Newkirk, Granbury, TX (US); Kyle Justin Rucker, Mineral Wells, TX (US)

(*) Notice: Subject to any disclaimer, the term of this patent is extended or adjusted under 35 U.S.C. 154(b) by 128 days.

(21) Appl. No.: 15/224,515

(22) Filed: Jul. 30, 2016

(65) Prior Publication Data

US 2017/0127659 A1 May 11, 2017

Related U.S. Application Data

(60) Provisional application No. 62/200,617, filed on Aug. 3, 2015.

(51) Int. Cl.
*A01K 97/05* (2006.01)
*A01K 63/02* (2006.01)
*A01K 63/00* (2017.01)

(52) U.S. Cl.
CPC ............ *A01K 97/05* (2013.01); *A01K 63/006* (2013.01); *A01K 63/02* (2013.01)

(58) Field of Classification Search
CPC ...... A01K 63/006; A01K 63/02; A01K 97/04; A01K 97/05
See application file for complete search history.

(56) References Cited

U.S. PATENT DOCUMENTS

| 2,651,137 | A | * | 9/1953 | Sweet | A01K 97/04 220/23.88 |
|---|---|---|---|---|---|
| 2,919,169 | A | * | 12/1959 | Jackson | A01K 97/22 220/553 |
| 3,344,552 | A | * | 10/1967 | Glasco | A01K 97/05 43/56 |
| 4,403,483 | A | * | 9/1983 | Lisalda | A01K 97/04 62/457.1 |
| 8,875,436 | B1 | * | 11/2014 | Bell | A01K 97/05 43/55 |
| 2003/0192895 | A1 | * | 10/2003 | Pfister | A01K 97/04 220/507 |

\* cited by examiner

*Primary Examiner* — Ryan A Reis

(57) ABSTRACT

A device that is inserted within a bait container or typical five (5) gallon bucket to subdivide said container or bucket into two (2) compartments. Additionally, the insert will allow water to flow through it and provide any bait oxygenated water in the newly created compartments from one (1) oxygen source (aerator).

1 Claim, 2 Drawing Sheets

BAIT CONTAINER INSERT, BAIT BUCKET DIVIDER

FIELD OF THE INVENTION

The present invention relates generally to bait housing and transportation, more specifically but not by way of limitation, a bait bucket insert that includes a singular divider to create a number of compartments wherein the internal divider can be placed into a bait bucket so that differing types of bait may be housed and transported without the necessity of using multiple buckets.

BACKGROUND

Many people fish for sport, recreation, and even profession. Most fishing typically involves the use of a rod and reel combination wherein the rod and reel is configured with a line having a hook on one end of the line. It is common to have some type of a bait secured to the hook in order to attempt to lure a fish and potentially catch the fish. There are many types of bait available on the marketplace ranging from artificial lures, dead bait and live bait. Many fishermen prefer the use of live bait, as they believe that the live bait attracts and provide the potential to catch the most fish.

Live bait is typically either purchased at a local bait shop or caught by the fisherman using various techniques. Different types of live bait can be utilized ranging from baitfish, shrimp, crawfish, and squid. The live bait is typically stored in a bait bucket using the water in which it was caught, either fresh or saltwater. This live bait is typically transported in containers known as a bait bucket or other similar device to the location at which the fisherman will fish and utilize the live bait.

One issue with live bait is that it needs to survive from the time of acquisition and last until the fishing trip is completed. Most bait is fragile and does not mix with other types of live bait. Shrimp tend to live better when the amount of shrimp in a given container are not in such large numbers where they will crawl on each other.

An issue with current bait containers is their inability to accommodate in one bucket at the same time, different types of live bait. For example but not by way of limitation, live mullet and live shrimp, live croaker and live shrimp, live mullet and live croaker all are examples that do not live well together in close areas because they might engage with each other in a manner that may be harmful. No bait bucket insert exists that is designed to allow a fisherman to keep the current bait bucket he has and insert a divider into said bucket to accommodate for multiple types of live fish within one bucket while allowing for the oxygenated, aerated water to pass through said insert if applicable. When applicable, only one aerator source will be necessary to provide oxygenated water to the various separated areas within the bait bucket.

Accordingly, there is a need for an internal divider that can be placed within a pre-existing bait bucket to create internal compartments wherein the internal divider wall facilitate the passing of certain various types of water therethrough.

SUMMARY OF THE INVENTION

It is the object of the present invention to provide a bait bucket insert that is operable for one's existing bait bucket and or other bait housing devices such as but not limited to an ice chest, to convert said bait bucket and or other bait housing device with 1 existing compartment into multiple compartments.

Another object of the present invention is to allow, when applicable, the use of various types of bait in one bait bucket or other bait housing device, while being separated by said bait bucket insert.

Yet another object of the present invention is to allow live shrimp, crawfish, and the likeness, the ability to climb the sides of the said insert. Said insert to give more surface area within said bait bucket and to dissipate the gathering of too many shrimp, and the likeness, at the bottom of the bucket, which causes early expiration of said live shrimp and the likeness.

To the accomplishment of the above and related object, the present invention may be embodied in the form illustrated in the accompanying drawings. Attention is called to the fact that the drawings are illustrative only. Variations are contemplated as being a part of the present invention, limited only by the scope of the claims.

DESCRIPTION OF THE DRAWINGS

A more complete understanding of the present invention may be had by reference to the following description of the following drawings not to any particular scale.

REFERENCE NUMERALS IN THE DRAWINGS

Figure 1:
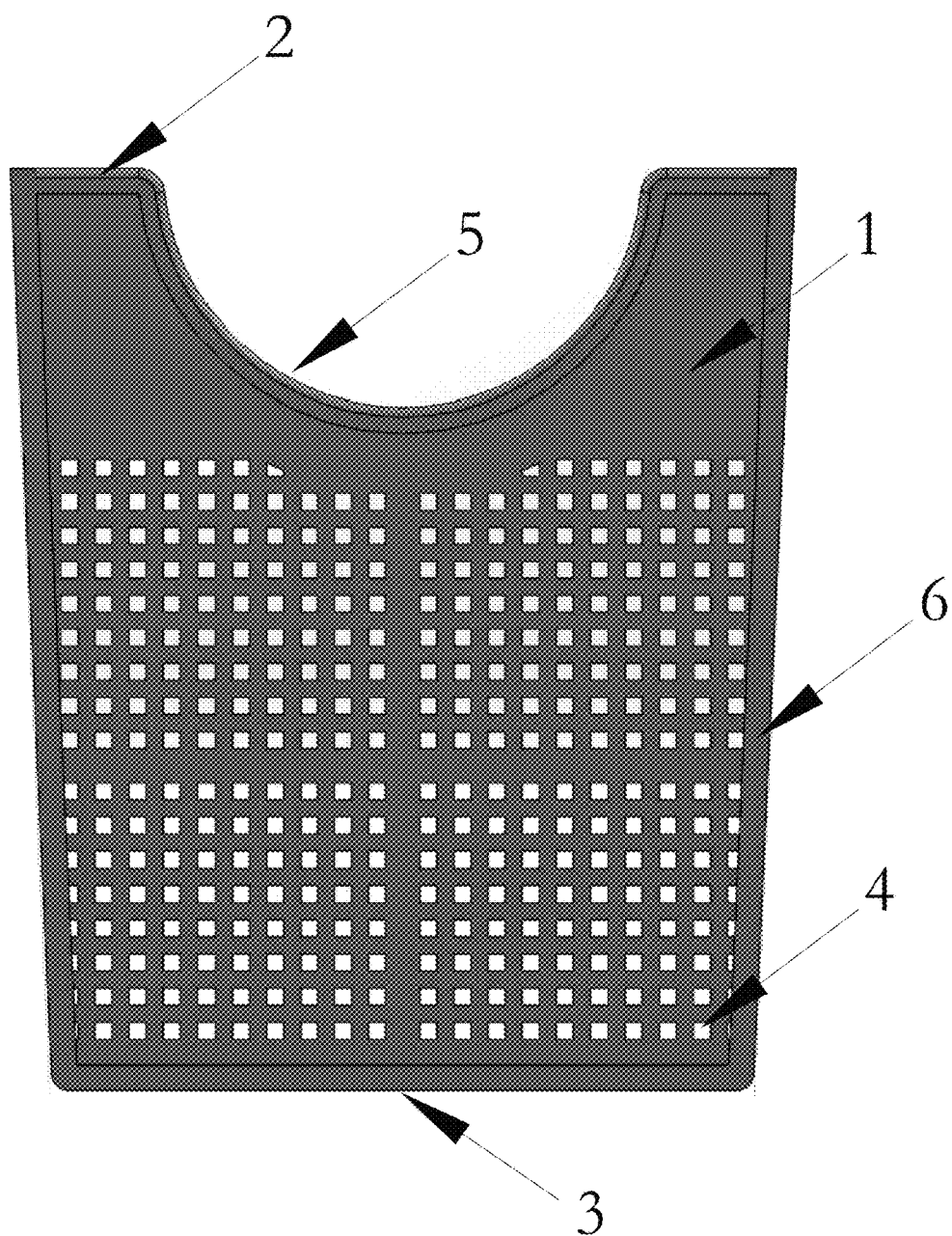
FIG. 1 is the front view, showing the present invention.
Figure 2:
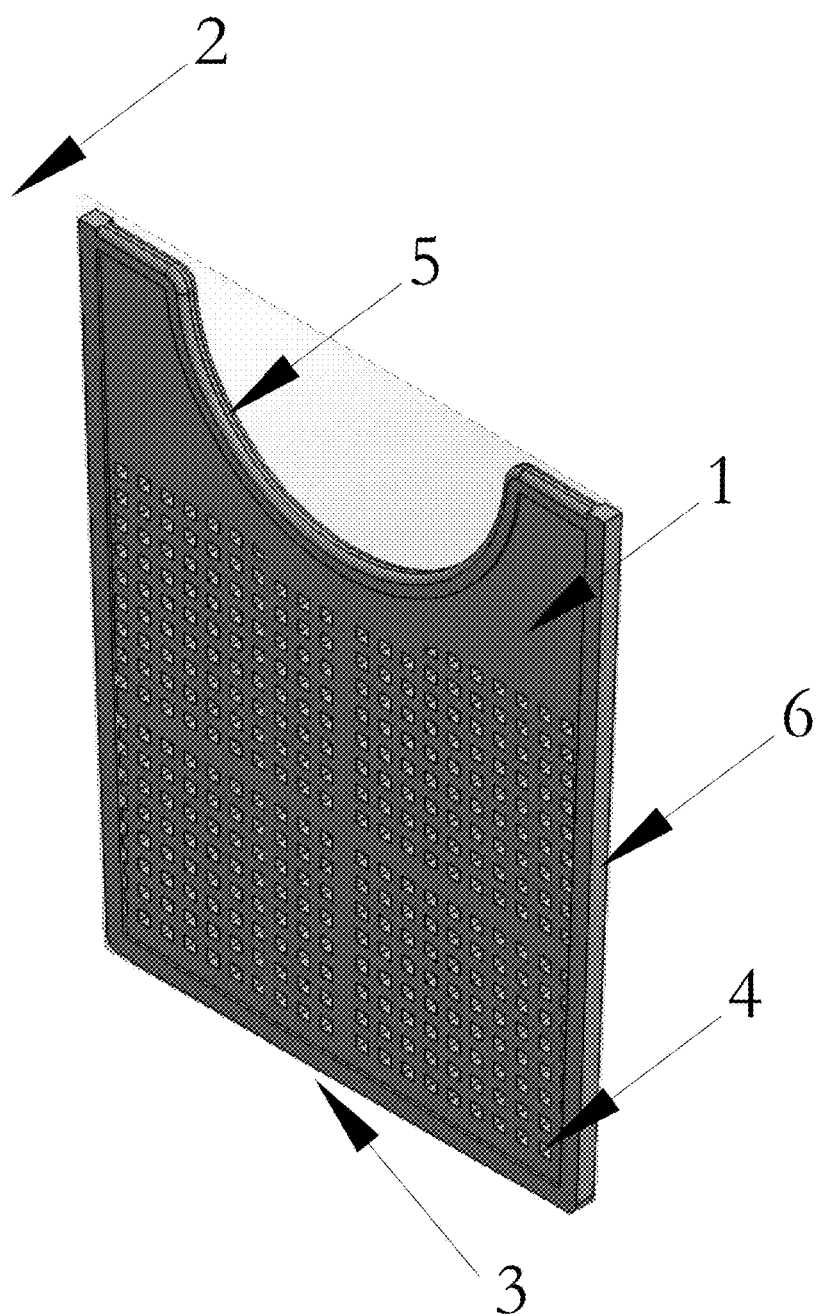
FIG. 2 is isometric view, showing the present invention.

1. Body
2. Top end
3. Bottom end
4. Opening
5. Ergonomical Top
6. Edge of insert

What is claimed is:
1. A bait container insert comprising:
   a body composed of a rigid material, said body having a bottom end and a top end, and an edge extending between the bottom end and the top end;
   said body having a thickness, the thickness being less than an edge thickness of the edge of the body;
   a plurality of openings extending through the thickness of the body to allow fluid flow through said body;
   a concave shape integral with the top end and extending from the top end toward the bottom end to allow a user's hand to reach to either side of the body to retrieve bait from a bait container;
   wherein the bait container insert is configured to be removably placed directly into the bait container, thereby separating the bait container into a first section and a second section;
   wherein the bottom end aligns with a bottom surface of the bait container and the edge aligns with interior edge surfaces of the bait container, thereby completely blocking access between the first section and the second section.

* * * * *